United States Patent [19]

Simmons

[11] Patent Number: 5,247,909

[45] Date of Patent: * Sep. 28, 1993

[54] COMBUSTION ENHANCEMENT SYSTEM

[75] Inventor: William R. Simmons, Rancho Palos Verdes, Calif.

[73] Assignee: Advanced Combustion Technologies, Inc., Gardena, Calif.

[*] Notice: The portion of the term of this patent subsequent to May 19, 2009 has been disclaimed.

[21] Appl. No.: 778,015

[22] Filed: Oct. 16, 1991

Related U.S. Application Data

[63] Continuation-in-part of Ser. No. 650,766, Feb. 4, 1991, Pat. No. 5,113,804.

[51] Int. Cl.$^5$ .............................................. F02B 75/12
[52] U.S. Cl. ..................................... 123/1 A; 123/23; 123/536; 123/545; 431/4
[58] Field of Search ................ 123/536, 539, 545, 556, 123/25 B, 25 D, 25 F, 1 A, 23, 198 A; 431/4

[56] References Cited

U.S. PATENT DOCUMENTS

| | | | |
|---|---|---|---|
| 3,925,001 | 12/1975 | Salooja | 431/4 |
| 3,961,609 | 6/1976 | Gerry | 123/1 A |
| 4,008,037 | 2/1977 | Hindin et al. | 431/4 |
| 4,114,566 | 9/1978 | Harpman et al. | 123/549 |
| 4,223,642 | 9/1980 | Okubo | 123/1 A |
| 4,295,816 | 10/1981 | Robinson | 431/4 |
| 4,362,130 | 12/1982 | Robinson | 123/1 A |
| 4,382,017 | 5/1983 | Robinson et al. | 123/1 A |
| 4,434,771 | 3/1984 | Slomnicki | 123/539 |
| 4,443,180 | 4/1987 | Le Frois | 431/4 |
| 4,715,325 | 12/1987 | Walker | 123/1 A |
| 4,752,302 | 6/1988 | Bowers | 431/4 |

FOREIGN PATENT DOCUMENTS

0119086 9/1984 European Pat. Off. .

Primary Examiner—Willis R. Wolfe
Assistant Examiner—Erick Solis
Attorney, Agent, or Firm—Fulwider, Patton, Lee & Utecht

[57] ABSTRACT

An apparatus and method for enhancing the efficiency of a combustion process and thereby reducing undesirable emissions in which a solid combustion enhancing substance is converted into a highly dispersed, gas-transportable state at a controlled rate and is subsequently conveyed into the zone of combustion. The use of a substance in its solid state eases handling and avails highly effective materials for combustion and enhancement while the necessary conversion of the substance from one state to another enables a high degree of control as to its rate of addition to the combustion process. The substance's highly dispersed state when it enters the combustion process maximizes its effect.

15 Claims, 1 Drawing Sheet

COMBUSTION ENHANCEMENT SYSTEM

BACKGROUND OF THE INVENTION

This is a continuation-in-part of Patent application Ser. No. 07/650,766 filed Feb. 4, 1991, now U.S. Pat. No. 5,113,804.

FIELD OF THE INVENTION

The present invention relates generally to a method and apparatus for increasing the efficiency of hydrocarbon combustion processes to thereby reduce the production of undesirable emissions. More particularly, the invention provides an apparatus and method for conveying, at a precisely controllable rate, minute quantities of a combustion enhancing substance directly to the site of combustion.

DESCRIPTION OF THE PRIOR ART

A wide variety of methods and devices have been disclosed that are intended to enhance the combustion of hydrocarbon fuels by introducing various substances into the combustion process. The intent is to improve efficiency, i.e. to increase the amount of the fuel's inherent chemical energy that is converted into thermal energy, and simultaneously to decrease undesirable emissions including unburned or incompletely burned hydrocarbons, carbon monoxide, and nitrogen oxides. Bringing about a more complete oxidation of the hydrocarbons and carbon monoxide has the simultaneous effect of increasing efficiency and decreasing the undesirable emissions.

A wide variety of substances have been relied upon to perform a variety of functions in the interests of enhancing combustion processes. Coreactants, catalysts, as well as compounds subject to operating mechanisms not fully understood have been introduced into combustion processes via the fuel supply, the oxidant supply or into the fuel and oxidant commixture just prior to or during actual combustion.

The viability of a particular system depends not only on the efficacy of the substance utilized, but also on how easily the substance can be handled as well as how easily the substance can accurately be delivered into the combustion process in a highly dispersed form at the proper levels. Substances have been identified that are effective at ppb-range concentrations but systems attempting to deliver such small concentrations in highly dispersed form have suffered from complexity and fail to maintain proper concentration levels. Maintaining the proper concentration level is important not only in terms of the economic considerations involved, but also because the presence in the combustion process of too little as well as too much active substance may diminish its combustion enhancing effect.

Platinum is an example of a substance known to promote combustion reactions at concentrations as low as 30 ppb of fuel. The extremely low concentration requirement precludes simply finely dividing the metal for gradual introduction into a combustion process not only in terms of actually being able to achieve 30 ppb, but also in terms of sufficiently dispersing such a small quantity of solid material amongst a typically highly dispersed fuel/oxidant combustible mixture. Platinum has extremely high melting and boiling points and therefore a commensurately low vapor pressure which hinders attempts to introduce the substance into a combustion process as a vapor. As a result of platinum's physical properties, direct addition of metallic platinum has not provided a viable approach to combustion enhancement. Various compounds of platinum have therefore been considered as vehicles for introducing a highly dispersed form of platinum into a combustion process, lots of attention having been focused on solutions of such compounds. While systems have been proposed that do thereby succeed in delivering the desired concentrations of highly dispersed platinum into a combustion process, practical problems prevail that make such systems complex and nonetheless unable to maintain a steady delivery rate. Moreover, the disclosed systems appear incapable of quickly and easily adjusting for changing feed rate requirements. A typical example of a prior art system is that provided by B.J. Robinson, in U.S. Pat. No. 4,295,816 wherein a system is described that introduces minute quantities of platinum into a diesel or gasoline engine's combustion chamber. A small quantity of combustion air is bubbled through a platinum compound containing aqueous solution at a constant rate to generate a catalyst containing mist which is then gradually drawn into the combustion chamber. This bursting bubble technique reportedly serves to draw out the catalytically active solute without significantly depleting the solvent, although some of the solvent is subject to evaporation. It would appear to be extremely difficult to maintain a constant platinum compound concentration within the aqueous solution which would have a commensurate effect on the amount of platinum transferred to the mist generated by the bubbling action. It is further conceivable that factors such as air temperature, solution temperature, and atmospheric pressure and humidity could effect the transfer rate of the platinum compound from solution to the mist. Less than the optimal catalyst concentration level would diminish the desired combustion enhancing effect, while greater than optimal concentrations would be wasteful and additionally, may in fact have a deleterious effect on the performance of the system as well. The inaccuracy of the delivery system as well as the problems attendant with the handling of solutions which require periodic concentration adjustment provides a typical example of the disadvantages associated with prior art systems. Similar systems have been proposed for a wide variety of substances thought to have a combustion enhancing effect including rhenium compounds.

Additional considerations are of critical importance in automotive applications wherein the combustion enhancing substance must not only be consumed at an economical rate, but the bulk and weight of the substance must be such so as to provide reasonably long replenishment intervals. Further, the combustion enhancing substance handling and delivery system should be adaptable to existing engine and vehicular designs. In the case of aftermarket applications, the system must further be readily adaptable to particular vehicles already in service.

The prior art has failed to provide a hydrocarbon combustion enhancing system capable of delivering minute quantities of an easily handleable and effective combustion enhancing substance at a precisely controllable rate for extended periods of time in an economical fashion. Moreover, systems have not been disclosed that provide for extended service cycles and which are readily adaptable to existing combustion processes.

SUMMARY OF THE INVENTION

The present invention overcomes the above noted shortcomings of the prior art to provide a method and apparatus for introducing minute quantities of a highly dispersed combustion enhancing substance into a combustion process. The method relies on the selection of a combustion enhancing substance that exists as an air stable solid under ambient conditions and is therefore easily handled and stored. Further, the substance is selected for its convertibility directly from its solid state into a highly dispersed, gas-transportable state, preferably simply by heating to within an easily attainable and easily maintainable temperature range. By obviating the need to form a solution, the present invention overcomes the difficulties associated with transferring a solute to a highly dispersed, gas-transportable state and additionally overcomes the difficulties associated with the handling of liquids and fluctuating solute concentrations.

The method of the present invention calls for the solid substance to be directly converted to its highly dispersed, gas-transportable state as by sublimation. Once the substance is in its gaseous form, it is transported to the combustion zone preferably by a flow of combustion air being inducted into the combustion process. By controlling the amount of substance allowed to convert into its gas-transportable form, the concentration of the substance participating in the combustion process is effectively controlled. The invention optionally/additionally calls for sensor feedback mechanisms to control the conversion rate of the substance from its solid form to its gas transportable state as a function of either fuel consumption rate or the emission rate of certain substances or as a function of indirect indications or approximations of such parameters.

It has been found that the present invention is most effectively practiced with the use of a Group VIII metal and most advantageously with the use of platinum in its metallic form. By oscillating the temperature of the metal between two values, it has been found that its conversion into a very effective, highly dispersed gas transportable form is very controllably achieved.

It is suspected that a first relatively low temperature induces a chemical change on the surface of the metal, such as the formation of the oxide, while the subsequent increase of the temperature to a relatively higher value causes the chemically changed, nominally oxidized form to be given off. Simply maintaining the higher temperature would appear to result in the emission of the metal in its unchanged, i.e. metallic form. The change, possibly an oxidation, at the lower temperature is necessary in order to produce the highly effective, highly dispersable gas transportable form.

In the case of platinum for use in enhancing the combustion process of an internal combustion engine, platinum foil is applied about an electric heating element positioned in the intake airflow of the engine. Current is supplied to the heating element to vary the foil's temperature between a first range of between 300°-700° F. and a second range of between 900° F.-1500° F. The required temperature ranges can be achieved by simply providing a constant timed on-off sequence. More accurate performance is achieved by actually monitoring the temperature of the foil and switching the current on when a point in the low range is achieved and off when a point in the high range is achieved. While the total amount of exposed area of the platinum foil determines the amount of combustion enhancing substance given off per unit time, the rate of heating and cooling is not only dependent on the amount of current drawn by the device but by the rate of airflow as well. This latter relationship provides an indirect indication of fuel consumption and allows the rate of combustion enhancing substance to automatically and approximately track fuel consumption rate.

Other features and advantages of the present invention will become apparent from the following detailed description, taken in conjunction with the accompanying drawings, which illustrate by way of example, the principles of the invention.

DETAILED DESCRIPTION OF A PREFERRED EMBODIMENT

The Figures schematically illustrate an apparatus with which the method of the present invention is practiced. The apparatus enables minute quantities of a combustion enhancing substance, originally in an easily handled solid state, to be introduced into an internal combustion engine's combustion chamber in a highly effective and dispersed state at a precisely controlled rate. The substance's presence during the combustion process increases the engine's power output, decreases the fuel consumption rate and decreases undesirable emissions in the engine's exhaust, including carbon monoxide and incompletely burned as well as unburned hydrocarbons.

Figure 1:
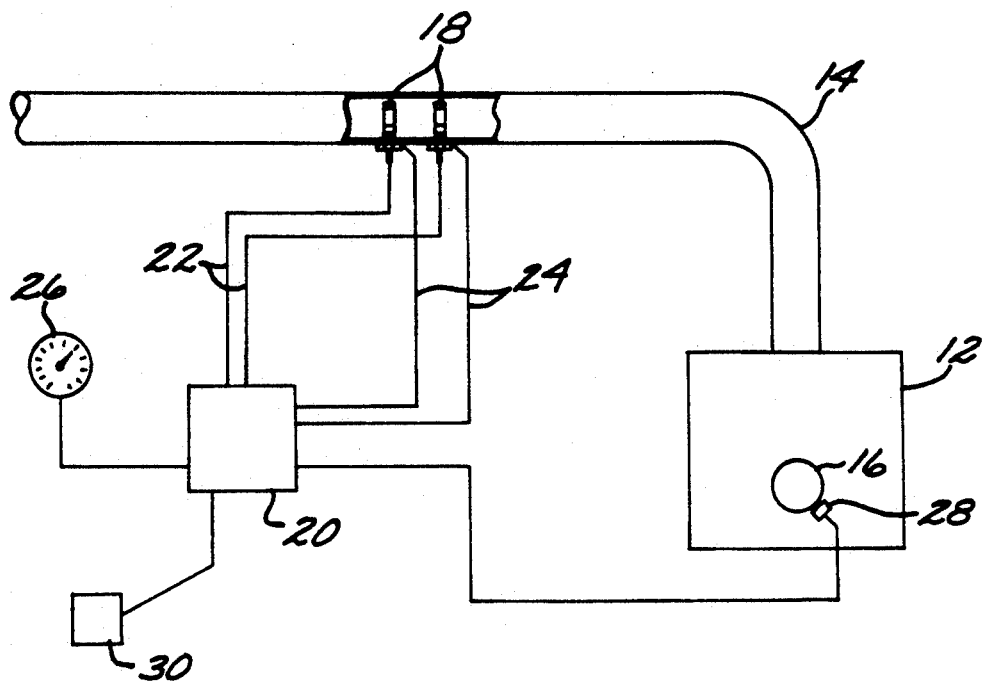
FIG. 1 schematically illustrates a combustion enhancing substance delivery system according to the present invention interconnected to an internal combustion engine.

FIG. 1 schematically illustrates an internal combustion engine 12 having an intake duct 14 and a rotating output shaft 16. At least one platinum foil coated heating element 18 is positioned in the intake duct 14 wherein it is exposed to intake airflow. Electrical current is supplied to heating element 18 via controller 20 through conduit 22. The controller optionally receives input from thermocouple 24, from timer 26, from tachometer 28 and or from a mechanical or electronic integrating device 30.

Figure 2:
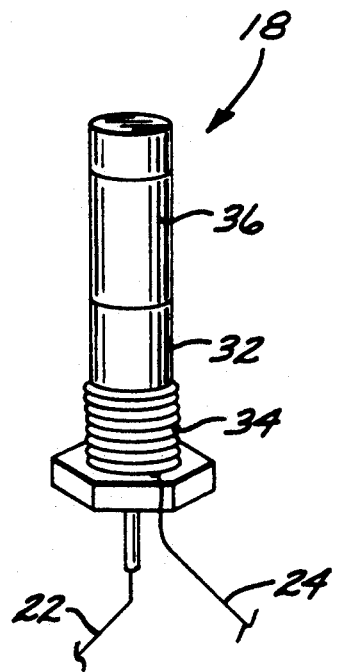
FIG. 2 is an enlarged view of the heating component of the combustion enhancing substance delivery system of the present invention.

FIG. 2 illustrates the preferred heating element 18 in the form of a readily available cartridge heater 32 having a threaded fitting 34 rigidly attached thereto and an electrode 36 projecting therefrom. Electrical current supplied by conduit 22 goes to ground within cartridge element 32 to generate heat. A section of platinum foil 36 is tacked directly onto the surface of heater 32.

This embodiment in its most basic form provides for the controller to switch the current to heater 18 on and off strictly as a function of time 26. By initially determining how much time a particular heating element in a particular application requires to achieve the higher temperature range under typical or average operating conditions and similarly determining the amount of time required for that heating element in that particular application to cool down to the lower range under typical or average operating conditions, a rough estimate of the necessary timing sequence is determined.

The constant timing approach described above can be modified to more effectively accommodate a wider range of operating conditions by monitoring engine speed via tachometer 28. Higher engine speed induces higher airflow which renders the higher temperatures more difficult to attain. Controller 20 is therefore optionally programmed to extend the dwell time as rpm's increase.

A more accurate function of the delivery system is attained by actually monitoring the temperature of the heating element via an internally mounted thermocouple 24. The controller 20 may then be programmed to increase or decrease dwell time as necessary.

An additional feature incorporated in the embodiment illustrated in FIG. 1 is an integrator 30 that serves to monitor the total consumption of the platinum. The controller 20 is programmed to sound an alarm or provide some other indication when the platinum 36 is depleted. This can be achieved electronically or with a mechanical device such as a mercury coulometer.

The use of multiple heating elements imparts more versatility to the system. A more constant flow of combustion enhancing substance can be achieved by alternating between the use of the two elements. In its simplest form the supplied current can simply be switched between two—one being on while the other is off and vice versa.

The platinum system has been found to be most effective with the variation of its temperature between a low range of between 300°-700° F. and a high range of between 900°-1500° F. Reductions in the exhaust's content of hydrocarbon, carbon monoxide, $NO_x$ and opacity are readily achievable while fuel consumption is reduced. Positive combustion enhancing effects have been observed at average addition rates of as low as 30 ppb while $NO_x$ tends to increase when average addition rates exceed 350 ppb. Good performance during the "snap idle test" in which a diesel engine's rpm's are momentarily increased and the exhaust opacity measured, appears to require average addition rates of about 150 ppb.

The total area of platinum must be matched to a particular engine's fuel consumption rate as this parameter ultimately limits the maximum combustion enhancing substance addition rate that is available.

EXAMPLE

In a test of the efficacy of the above described preferred embodiment a 2-stroke 552 cubic inch, water cooled, Detroit Diesel V-6 92 was coupled to a dynomometer. Two stainless steel cased cartridge heaters (0.375" diameter×3.00" long) each having a 1.00"×1.17" section of 0.005" platinum foil tacked on to the area of highest heat generation were positioned in the intake air flow of the engine. The air velocity was measured to be 35 knots, each heater drew 327 watts for time intervals of 3 minutes every 6 minutes resulting in a mass loss of 1.2 mg/hour. The engine was warmed up for one hour, run for 2 hours to establish the baseline after which measurements were averaged for the subsequent six hours to yield the following results.

| TEST POINT | HC PPM | NOX PPM | CO PPM | OXYGEN PERCENT | GMS/HR FUEL | OPACITY PERCENT |
|---|---|---|---|---|---|---|
| BASELINE | 331 | 324 | 247 | 15.00 | 3932 | 99 |
| INJECTION | 217 | 315 | 171 | 15.00 | 3764 | 42 |
| PERCENT CHANGE | −34.45 | −2.55 | −30.94 | 0 | −4.27 | −57.58 |

(emission data adjusted to 15% oxygen levels as standard)

The results clearly show a favorable reduction in all measured parameters.

While a particular form of the invention has been illustrated and described, it will also be apparent to those skilled in the art that various modifications can be made without departing from the spirit and scope of the invention. It is not intended that this invention be limited to a particular type of internal combustion engine or even any specific combustion process. Further, no limitation is intended with respect to any particular combustion enhancing substance. Accordingly, it is not intended that the invention be limited except as by the appended claims.

What is claimed is:

1. A device for enhancing the efficiency of a combustion process in which a hydrocarbon fuel is consumed in a combustion zone, and for thereby diminishing the emission therefrom of undesirable compounds such as carbon monoxide and incompletely oxidized hydrocarbons, comprising:

means for positioning a solid material, convertible into a highly dispersed, gas transportable, combustion enhancing substance, within a flow of combustion air being inducted into said combustion process; and means for oscillating the temperature of said solid material between a first and second, relatively higher, range of temperature in order to convert said material into its gas transportable state.

2. The device of claim 1, wherein said material is in the form of a metallic foil applied directly to the surface of a heating element.

3. The device of claim 2, wherein said heating element is electrically heated.

4. The device of claim 1 wherein platinum foil is applied to the surface of an electric heating element.

5. The device of claim 4 wherein said first temperature range comprises 300° to 700° F. and said second temperature range comprises 900° to 1500° F.

6. The device of claim 1 wherein said temperature oscillating means comprises means for periodically heating said material so as to attain said second relatively higher temperature range while said flow of combustion air is subsequently relied upon to cool said material down to said first range of temperature.

7. The device of claim 6 wherein said material is applied to the surface of an electric heating element and current is supplied thereto for a preselected period of time at preselected intervals.

8. The device of claim 7 wherein said preselected periods of time are increased as a function of the rate of combustion airflow.

9. The device of claim 6 wherein said material is applied to the surface of an electric heating element and further comprising means of supplying current to said element until said second range of temperature is achieved after which current is discontinued until the first range of temperature is achieved whereby the flow of combustion air is relied upon to cool said element.

10. A method for enhancing the efficiency of a combustion process in which a hydrocarbon fuel is consumed in a combustion zone, and for thereby diminishing emission therefrom of undesirable compounds such as carbon monoxide and incompletely oxidized hydrocarbons, comprising the steps of:

selecting a material that exists as a solid stable metal at ambient conditions while having the ability to significantly enhance the combustion process at ppb range concentrations upon conversion into a highly dispersed, gas transportable substance;

positioning said material in the flow of combustion air inducted into said combustion process; and oscillating the temperature of said material between a first and a second, relatively higher, temperature range in order to convert said material into its gas transportable state.

11. The method of claim 10 wherein said temperature oscillation is achieved by periodically heating said material to said second temperature range followed by intervals in which the combustion air flow is relied upon to cool said material to said first temperature range.

12. The method of claim 11 wherein an electric heating element to which said material is applied is energized for preselected periods of time at preselected intervals.

13. The method of claim 12 wherein said preselected periods are extended as airflow is increased.

14. The method of claim 12 wherein said heating element is energized until said second temperature range is achieved and deenergized until said first temperature range is achieved.

15. The method of claim 11 wherein platinum foil is applied to an electric heating element and said first temperature range comprises 300°-700° F. while said second temperature range comprises 900°-1500° F.

* * * * *